(12) United States Patent
Ozeki (10) Patent No.: US 11,668,390 B2
(45) Date of Patent: Jun. 6, 2023

(54) LUBRICATING STRUCTURE FOR POWER TRANSMISSION MECHANISM

(71) Applicant: SUZUKI MOTOR CORPORATION, Hamamatsu (JP)

(72) Inventor: Hisashi Ozeki, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 17/503,033

(22) Filed: Oct. 15, 2021

(65) Prior Publication Data

US 2022/0128144 A1 Apr. 28, 2022

(30) Foreign Application Priority Data

Oct. 27, 2020 (JP) .............................. JP2020-179470

(51) Int. Cl.
*F16H 57/04* (2010.01)

(52) U.S. Cl.
CPC ..... *F16H 57/0475* (2013.01); *F16H 57/0427* (2013.01); *F16H 57/0471* (2013.01); *F16H 57/0408* (2013.01)

(58) Field of Classification Search
CPC ............. F16H 57/0475; F16H 57/0427; F16H 57/0471; F16H 57/0408; F16H 2057/02065; F16H 57/0423; F16H 57/0489; F16H 57/0426; F01M 9/08; F01M 9/10; F01M 9/105; F16N 2210/12; F01L 2810/02; F01L 1/022
USPC ...................................................... 123/196 R
See application file for complete search history.

(56) References Cited

U.S. PATENT DOCUMENTS

| | | | |
|---|---|---|---|
| 2003/0070661 A1 | 4/2003 | Yasui | 123/572 |
| 2006/0137636 A1* | 6/2006 | Oshita | F02B 61/02 123/90.31 |
| 2009/0084207 A1* | 4/2009 | Raman | F01M 1/06 74/325 |
| 2015/0045163 A1* | 2/2015 | Botez | F16H 7/06 474/91 |

FOREIGN PATENT DOCUMENTS

JP 3965960 B2 8/2007

* cited by examiner

*Primary Examiner* — Yi-Kai Wang
(74) *Attorney, Agent, or Firm* — Stein IP LLC (57) ABSTRACT

There is provided a lubricating structure for a power transmission mechanism in which a crankshaft is coupled to a piston disposed in a cylinder bore and in which power is transmitted from the crankshaft to a camshaft. The lubricating structure includes: an idler gear that is configured to transmit power from the crankshaft to the camshaft; and an idler gear shaft that supports the idler gear via a bearing. One end portion of the idler gear shaft protrudes into the cylinder bore, and an oil passage configured to guide oil from the cylinder bore to the bearing is formed in the idler gear shaft.

3 Claims, 7 Drawing Sheets

LUBRICATING STRUCTURE FOR POWER TRANSMISSION MECHANISM

CROSS-REFERENCE TO RELATED APPLICATIONS

This application is based on Japanese Patent Application No. 2020-179470 filed on Oct. 27, 2020, the contents of which are incorporated herein by way of reference.

TECHNICAL FIELD

The present invention relates to a lubricating structure for a power transmission mechanism.

BACKGROUND

An engine is equipped with a valve gear that transmits power from a crankshaft to a pair of camshafts to operate an intake valve and an exhaust valve by the pair of camshafts. As a power transmission mechanism of this type of valve gear, a mechanism employing a semi-cam gear train in which gear transmission and chain transmission are combined has been known (for example, see Patent Literature 1). In the power transmission mechanism disclosed in Patent Literature 1, an idler gear shaft parallel to a crankshaft is provided, a drive gear of the crankshaft is coupled to an idler gear of the idler gear shaft, and the idler gear is coupled to a pair of camshafts via a cam chain.
Patent Literature 1: Japanese Patent No. 3965960

However, in the power transmission mechanism disclosed in Patent Literature 1, splashes of oil are less likely to adhere to the idler gear and the idler gear shaft, and there is a possibility that a bearing supporting the idler gear shaft is insufficiently lubricated, resulting in a decrease in durability. A method of forcibly supplying oil to the bearing is also conceivable, but a mechanical loss increases due to an increase in a discharge amount of an oil pump, and an engine output decreases. Such a problem may occur not only in the power transmission mechanism of the semi-cam gear train type but also in a power transmission mechanism of a cam gear train type that moves only by gear transmission.

The present invention has been made in view of the above, and an object of the present invention is to provide a lubricating structure for a power transmission mechanism capable of improving performance of lubricating a bearing of an idler gear shaft without reducing an engine output.

SUMMARY

To solve the above problem, there is provided a lubricating structure for a power transmission mechanism according to an aspect of the present invention in which a crankshaft is coupled to a piston disposed in a cylinder bore and in which power is transmitted from the crankshaft to a camshaft. The lubricating structure includes: an idler gear that is configured to transmit power from the crankshaft to the camshaft; and an idler gear shaft that supports the idler gear via a bearing. One end portion of the idler gear shaft protrudes into the cylinder bore, and an oil passage configured to guide oil from the cylinder bore to the bearing is formed in the idler gear shaft.

DESCRIPTION OF EMBODIMENTS

In a lubricating structure for a power transmission mechanism according to an aspect of the present invention, a crankshaft is coupled to a piston disposed in a cylinder bore, and power is transmitted from the crankshaft to a camshaft. The lubricating structure for a power transmission mechanism includes an idler gear that transmits power from the crankshaft to the camshaft, and an idler gear shaft that supports the idler gear via a bearing. One end portion of the idler gear shaft protrudes into the cylinder bore, splashes of oil in the cylinder bore are taken in from the one end portion of the idler gear shaft, and the oil is guided from the cylinder bore to the bearing through an oil passage formed in the idler gear shaft. With an increase in the amount of oil supplied to the bearing, durability of the bearing is improved. In addition, with a decrease in a discharge amount of an oil pump, mechanical loss is reduced and an engine output is improved, as compared with a method of forcibly supplying oil to the bearing.

Embodiment

Figure 1:
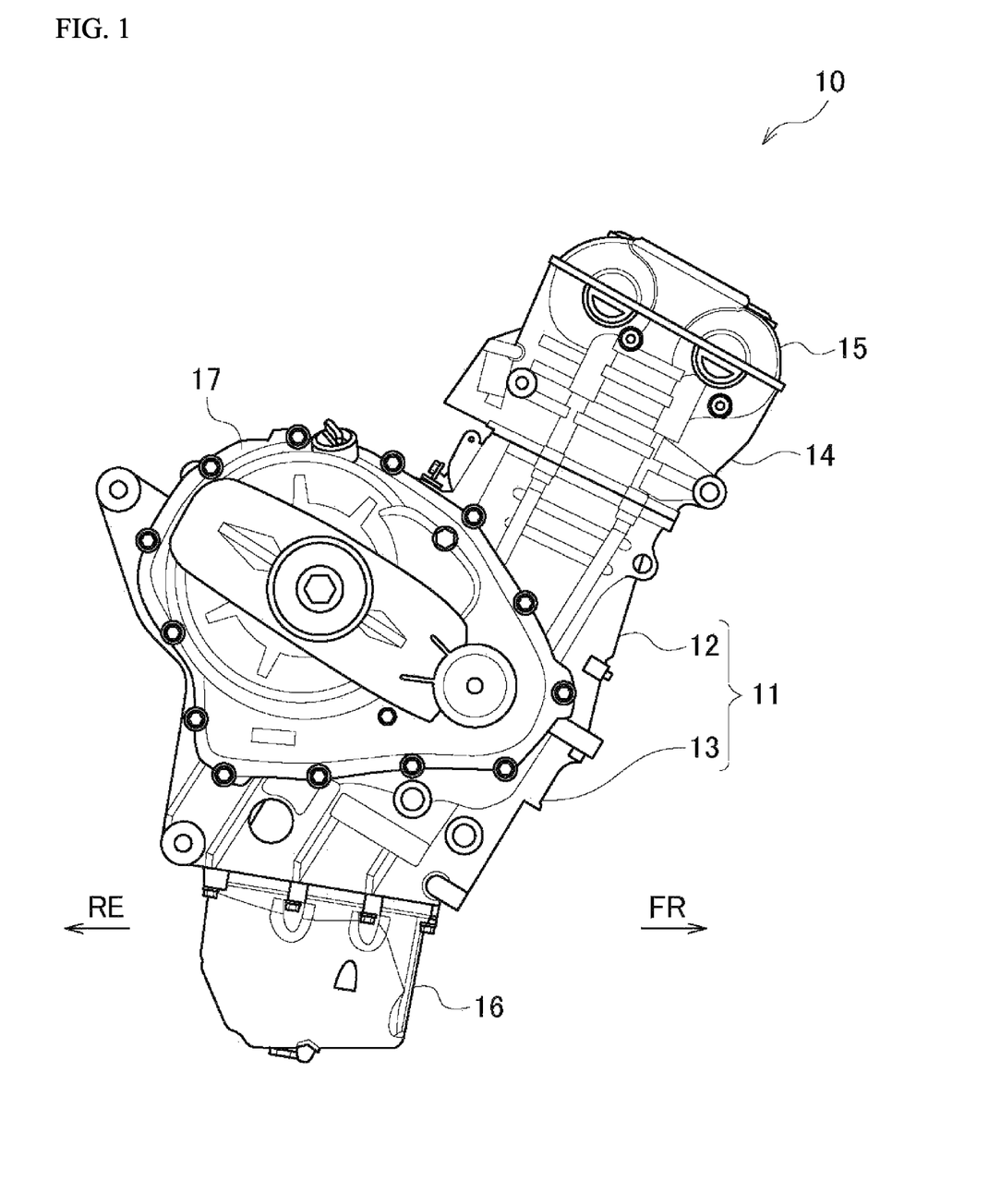
FIG. 1 is a right side view of an engine according to the present embodiment.
Figure 2:
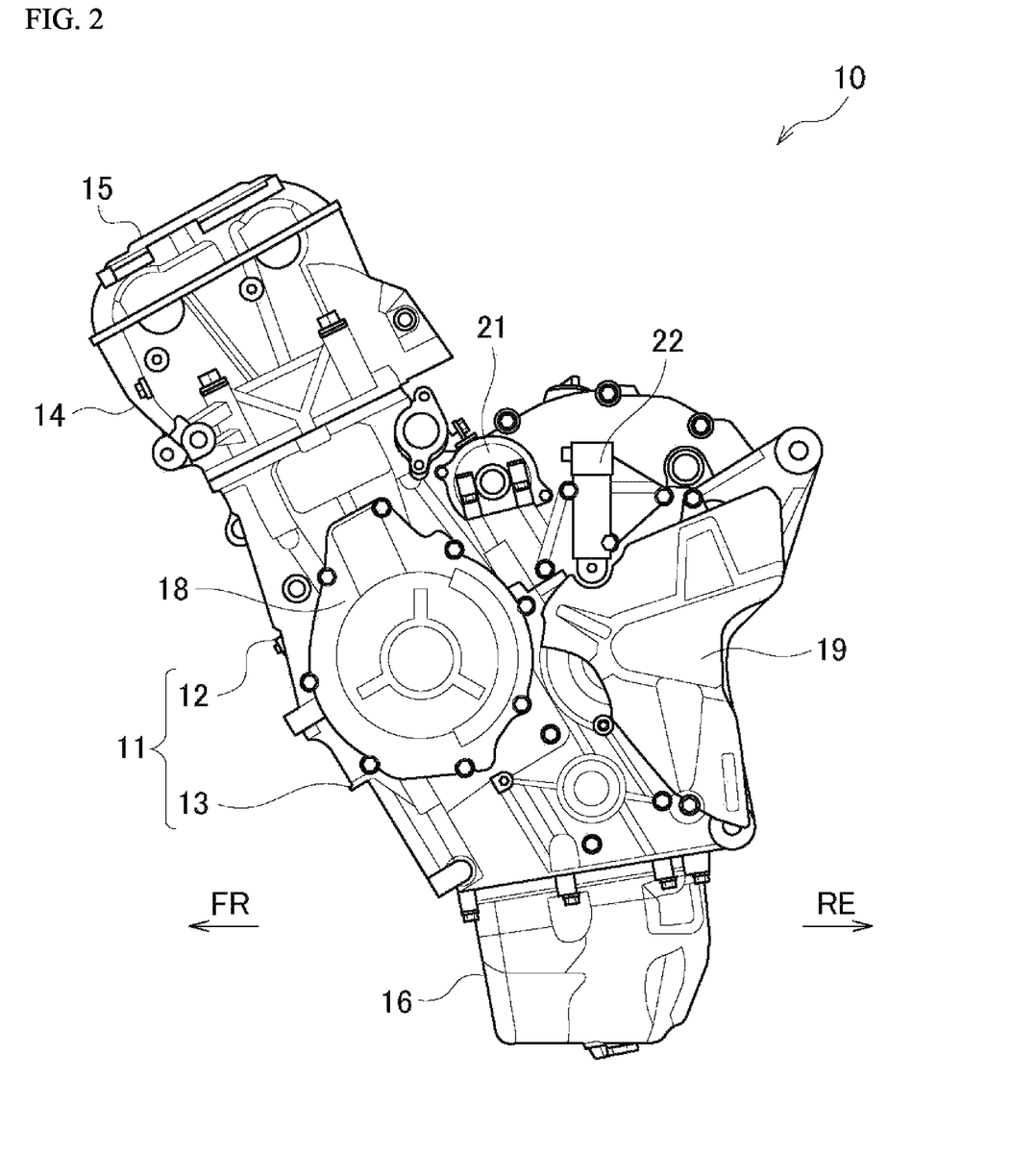
FIG. 2 is a left side view of the engine according to the present embodiment.

Hereinafter, an engine to which a lubricating structure for a power transmission mechanism of the present embodiment is applied will be described with reference to the accompanying drawings. FIG. 1 is a right side view of the engine according to the present embodiment. FIG. 2 is a left side view of the engine according to the present embodiment. In the following drawings, an arrow FR indicates a vehicle front side, an arrow RE indicates a vehicle rear side, an arrow L indicates a vehicle left side, and an arrow R indicates a vehicle right side.

As illustrated in FIG. 1, an engine 10 includes a crankcase 11 having a vertically divided structure including an upper case 12 and a lower case 13. The upper case 12 is integrated with a cylinder, and a cylinder head 14 and a cylinder head cover 15 are attached to an upper portion of the upper case 12. A valve gear (not shown) for operating intake and exhaust valves is accommodated inside the cylinder head 14 and the cylinder head cover 15. An oil pan 16 that stores oil for lubrication and cooling is attached to a lower portion of the lower case 13. A clutch cover 17 that covers a clutch (not shown) from a lateral side is attached to a right side surface of the crankcase 11.

As illustrated in FIG. 2, a magneto cover 18 that covers a magneto (not shown) from a lateral side is attached to a left side surface of the crankcase 11. A sprocket cover 19 that covers both a part of a drive chain (not shown) for driving a rear wheel and a drive sprocket (not shown) from a lateral side is attached on a rear side of the magneto cover 18. A starter motor 21 for starting the engine 10 is attached on an upper side of the magneto cover 18, and an oil control valve 22 for controlling hydraulic pressure of the engine 10 is attached on an upper side of the sprocket cover 19. Various types of power transmission mechanisms are accommodated inside the engine 10.

Figure 3:
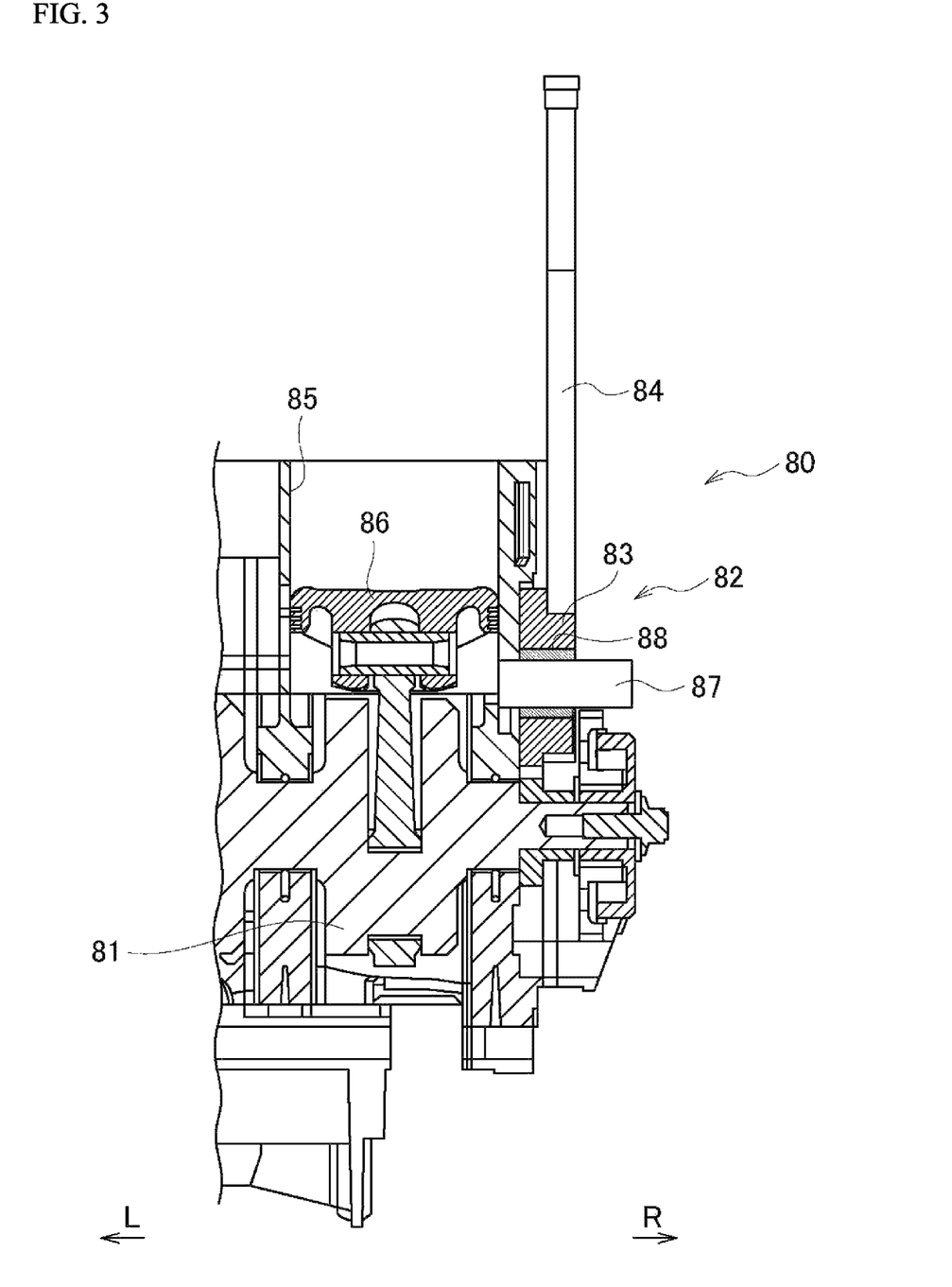
FIG. 3 is a schematic view of a peripheral portion of a crankshaft according to a comparative example.

For example, as illustrated in a comparative example of FIG. 3, a power transmission mechanism 82 that transmits power of a crankshaft 81 to a valve gear is accommodated inside an engine 80. The power transmission mechanism 82 is a so-called semi-cam gear train, and transmits power of the crankshaft 81 to the valve gear via a chain idler gear 83 and a timing chain 84. Although oil for lubricating the crankshaft 81 exists in a state of splashes on a lower side of the piston 86 inside the cylinder bore 85, the oil is less likely to adhere to an idler gear shaft 87 that is separated from the cylinder bore 85 by a side wall. Therefore, durability of the bearing 88 of the chain idler gear 83 is low.

Figure 6:
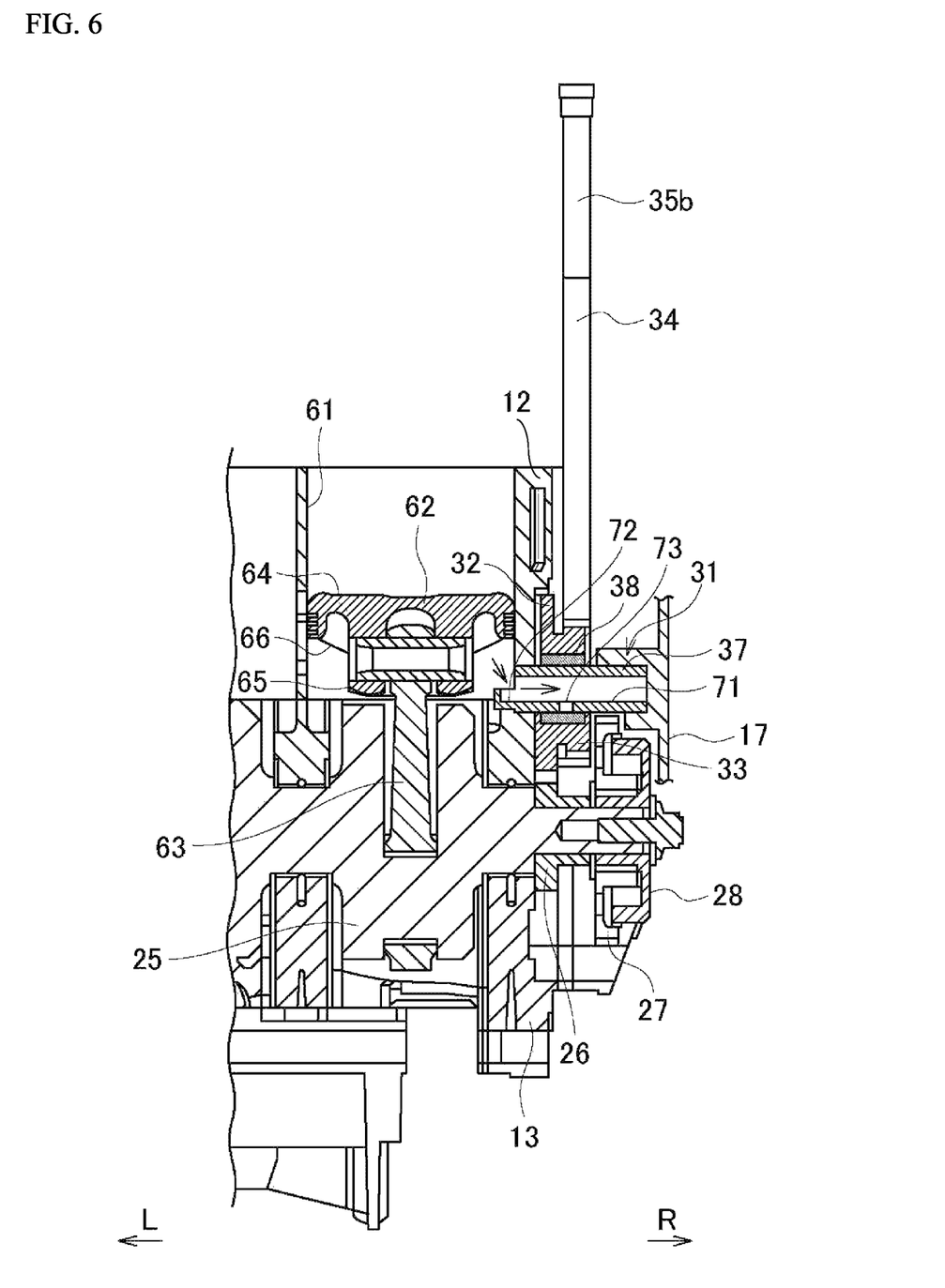
FIG. 6 is a cross-sectional view taken along a line A-A of FIG. 4.

Therefore, in a lubricating structure for a power transmission mechanism 30 (see FIG. 4) of the present embodiment, an idler gear shaft 37 protrudes into a cylinder bore 61, and oil in the cylinder bore 61 is taken into an oil passage 71 formed in the idler gear shaft 37 (see FIG. 6). The oil is supplied to a bearing 38 through the oil passage 71 of the idler gear shaft 37, thereby improving durability of the bearing 38. In this way, the bearing 38 of a chain idler gear 31 (idler gear) is lubricated using the oil in the cylinder bore 61, and accordingly a structure that forcibly supplies oil in a main gallery of the engine 10 to the bearing 38 is not required.

Figure 4:
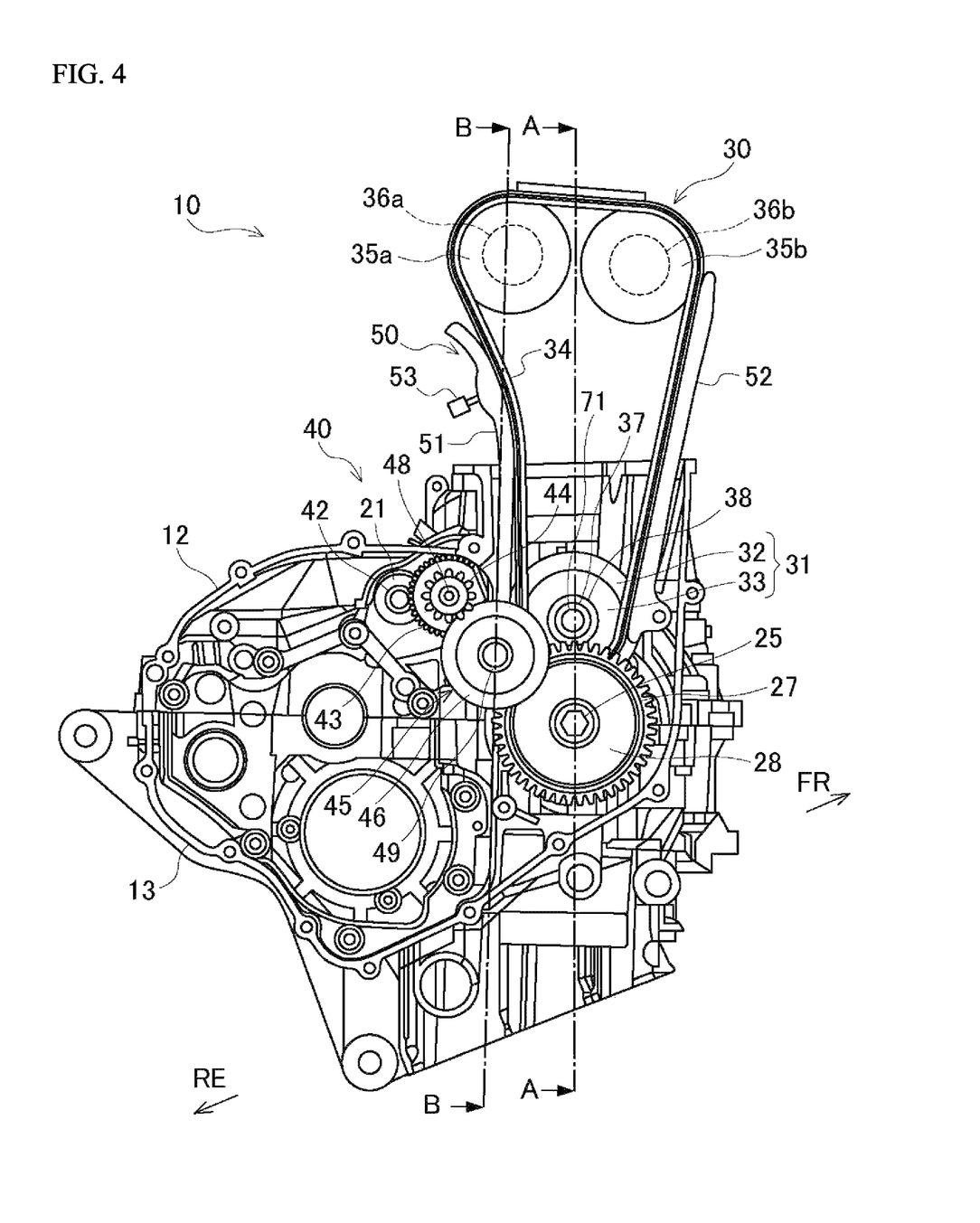
FIG. 4 is a cross-sectional view of the engine according to the present embodiment.
Figure 5:
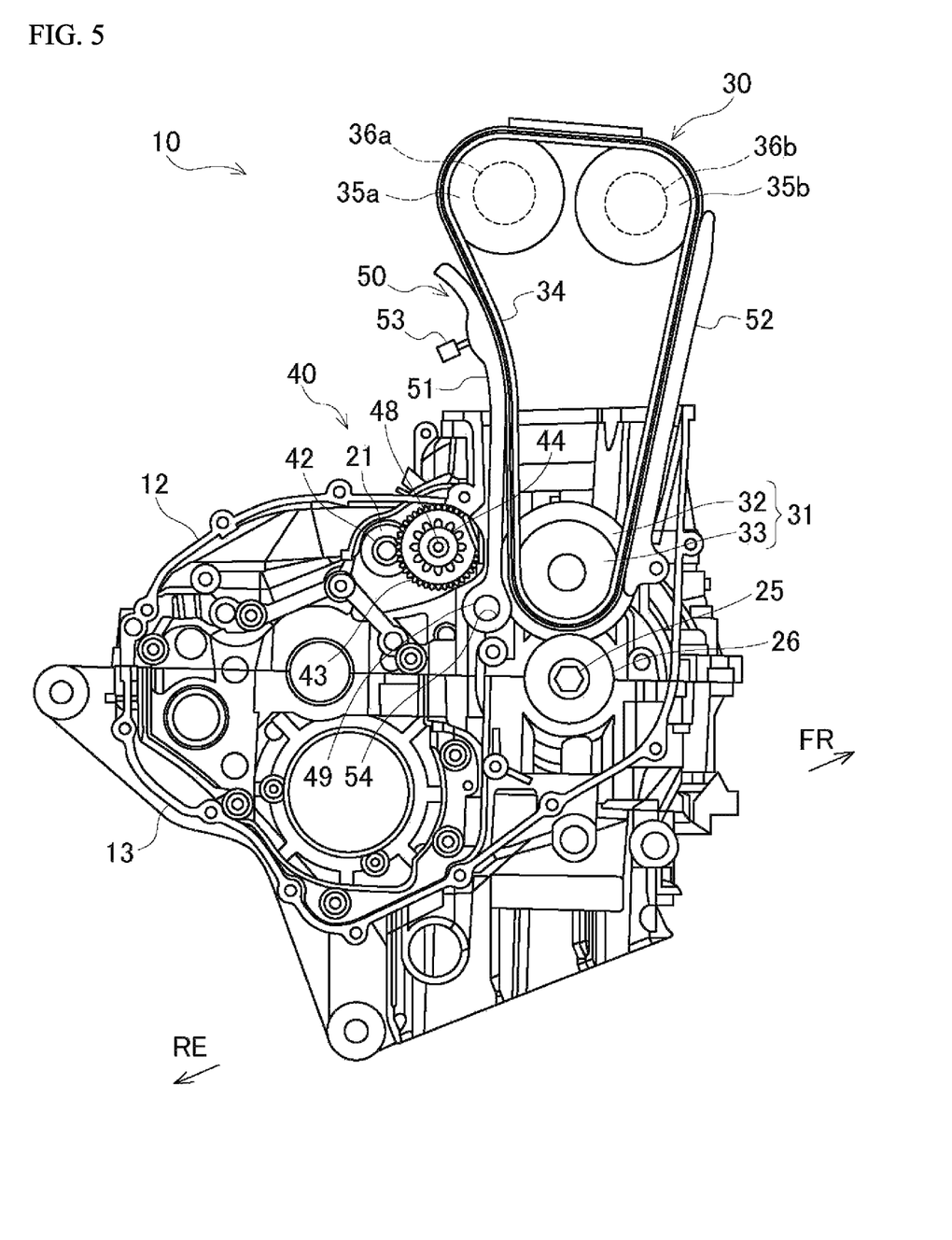
FIG. 5 is a view in which a part of a gear train of an engine starting device is removed from FIG. 4.

The power transmission mechanism in the engine and an engine starting device will be described with reference to FIGS. 4 and 5. FIG. 4 is a cross-sectional view of the engine according to the present embodiment. FIG. 5 is a view in which a part of a gear train of the engine starting device is removed from FIG. 4.

As illustrated in FIGS. 4 and 5, the power transmission mechanism 30 that transmits power from a crankshaft 25 to a pair of camshafts 36a and 36b of a valve gear (not shown) is accommodated inside the engine 10. The power transmission mechanism 30 is a semi-cam gear train in which gear transmission and chain transmission are combined, and a chain idler gear 31 and a pair of cam sprockets 35a and 35b are connected by a timing chain 34 to move the pair of camshafts 36a and 36b. The crankshaft 25 is provided with a chain drive gear 26 (see FIG. 5) on an inner side of a starter clutch gear 27 in an engine width direction, and power is transmitted from the chain drive gear 26 to the chain idler gear 31.

The chain idler gear 31 is integrally formed with a large-diameter gear 32 located on the inner side in the engine width direction and a small-diameter gear 33 located on an outer side in the engine width direction. The large-diameter gear 32 is coupled to the chain drive gear 26, and the large-diameter gear 32 is rotated by receiving power of the crankshaft 25 from the chain drive gear 26. A lower portion of the timing chain 34 is engaged with the small-diameter gear 33, and an upper portion of the timing chain 34 is engaged with the pair of cam sprockets 35a and 35b. The large-diameter gear 32 and the small-diameter gear 33 rotate integrally to move the timing chain 34 in a rotating manner, and the camshafts 36a and 36b coupled to the pair of cam sprockets 35a and 35b are rotated.

The timing chain 34 is guided by a lever guide 51 and a chain guide 52. The timing chain 34 sent from the small-diameter gear 33 to the cam sprocket 35a is guided by the lever guide 51, and the timing chain 34 drawn from the cam sprocket 35b to the small-diameter gear 33 is guided by the chain guide 52. Since slackness may occur in the timing chain 34 going from the small-diameter gear 33 toward the cam sprocket 35a, the lever guide 51 is pressed against the timing chain 34 by a tensioner body 53, and tension is applied to the timing chain 34. The lever guide 51 and the tensioner body 53 form a chain tensioner 50.

The chain idler gear 31 is supported by the idler gear shaft 37 via the bearing 38. The idler gear shaft 37 is supported by the upper case 12 and the clutch cover 17 (see FIG. 1). One end portion of the idler gear shaft 37 penetrates a side wall of the upper case 12 and protrudes into the cylinder bore 61 (see FIG. 6). The oil passage 71 is formed in the idler gear shaft 37 in an axial direction, and oil is guided from the cylinder bore 61 to the bearing 38 through the oil passage 71. A lubricating structure for the bearing 38 served by the oil passage 71 in the idler gear shaft 37 will be described later.

An engine starting device 40 that starts the engine 10 by the starter motor 21 is accommodated inside the engine 10. The engine starting device 40 transmits power from the starter motor 21 to the crankshaft 25 via a gear train. The starter motor 21 starts and rotates the crankshaft 25 until the engine 10 can operate autonomously. The starter motor 21 is attached to an upper portion of a left side surface of the upper case 12 at a rear position of the cylinder. A pinion gear 42 is formed on an output shaft of the starter motor 21, and a first starter idler gear 43 is coupled to the pinion gear 42.

A limiter gear 44 is supported by an idler gear shaft 48 of the first starter idler gear 43. The limiter gear 44 is separated from the first starter idler gear 43 in the engine width direction, and power is transmitted from the limiter gear 44 to a second starter idler gear 45. The second starter idler gear 45 is integrally formed with a large-diameter gear 46 located on the outer side in the engine width direction and a small-diameter gear 47 (see FIG. 7) located on the inner side in the engine width direction. The limiter gear 44 is coupled to the large-diameter gear 46, and the starter clutch gear 27 coaxial with the crankshaft 25 is coupled to the small-diameter gear 47.

The starter clutch gear 27 is provided with a starter one-way clutch 28, and only power transmission from the starter motor 21 side to the crankshaft 25 side is allowed. The second starter idler gear 45 is coupled to the starter motor 21 via the pinion gear 42, the first starter idler gear 43, and the limiter gear 44, and the second starter idler gear 45 is rotated by receiving power from the starter motor 21. The starter clutch gear 27 rotates together with the second starter idler gear 45, and then the crankshaft 25 starts to rotate via the starter one-way clutch 28.

The second starter idler gear 45 is rotatably supported by an idler gear shaft 49. The lever guide 51 of the chain tensioner 50 is swingably supported by the idler gear shaft 49. A pivot hole 54 (see FIG. 5) is formed in a base end portion (lower portion) of the lever guide 51, and the idler gear shaft 49 is inserted into the pivot hole 54. Since the idler gear shaft 49 is used for supporting the second starter idler gear 45 and the lever guide 51, the engine starting device 40 is brought close to the chain tensioner 50, and the engine 10 is made compact.

In the side view of the engine, the base end portion of the lever guide 51 is disposed between the limiter gear 44 and the crankshaft 25 in an up-down direction. At this time, the base end portion of the lever guide 51 is disposed on a lower side of the idler gear shaft 37 of the power transmission mechanism 30, and a part of the base end portion of the lever guide 51 overlaps with the chain idler gear 31 (see FIG. 5). The lever guide 51 extends upward from the idler gear shaft 49, and the lever guide 51 is disposed between the chain idler gear 31 and the limiter gear 44 in a front-rear direction.

With such a layout, coaxial arrangement of the second starter idler gear 45 and the base end portion of the lever guide 51 is implemented.

Further, the idler gear shafts 48 and 49 of the engine starting device 40 are supported by the upper case 12 and the clutch cover 17 (see FIG. 1) similarly to the idler gear shaft 37 of the power transmission mechanism 30. In the side view of the engine, the pinion gear 42, the first starter idler gear 43 and the chain idler gear 31 are arranged side by side in the front-rear direction at substantially the same height. In the side view of the engine, the second starter idler gear 45 is disposed between the first starter idler gear 43 and the chain idler gear 31 in the front-rear direction and between the chain idler gear 31 and the starter clutch gear 27 in the up-down direction.

That is, the chain idler gear 31 is disposed on an upper side of the crankshaft 25, and the second starter idler gear 45 is disposed on an upper side of the crankshaft 25 and on a rear side of the chain idler gear 31. A part of the second starter idler gear 45 overlaps with the large-diameter gear 32 of the chain idler gear 31. Accordingly, in the engine 10 employing the power transmission mechanism 30 of the semi-cam gear train, the second starter idler gear 45 of the engine starting device 40 and the chain idler gear 31 of the power transmission mechanism 30 are brought close to each other, and thus the engine 10 is made compact.

The lubricating structure for the power transmission mechanism will be described with reference to FIG. 6. FIG. 6 is a cross-sectional view taken along a line A-A of FIG. 4. FIG. 6 illustrates a state where a piston is located at a bottom dead center.

As illustrated in FIG. 6, a piston 62 is disposed in the cylinder bore 61, and the crankshaft 25 is coupled to the piston 62 via a connecting rod 63. The idler gear shaft 37 parallel to the crankshaft 25 is attached right above the crankshaft 25. The idler gear shaft 37 is disposed on a lateral side of the cylinder bore 61, and the chain idler gear 31 is rotatably supported by the idler gear shaft 37 via the bearing 38. The one end portion of the idler gear shaft 37 penetrates the side wall of the upper case 12 and protrudes into the cylinder bore 61.

The idler gear shaft 37 has a hollow cylindrical shape, and the oil passage 71 is formed in the idler gear shaft 37 in the axial direction. An upper half of the one end portion of the idler gear shaft 37 is cut out to form an oil drip tray 72 serving as an inlet of the oil passage 71. An intermediate portion of the idler gear shaft 37 overlaps with the bearing 38, and an oil supply hole 73 serving as an outlet of the oil passage 71 is formed in the intermediate portion. As indicated by arrows, oil in the cylinder bore 61 is taken into the oil passage 71 from the drip tray 72, and the oil in the oil passage 71 is supplied to the bearing 38 from the oil supply hole 73.

At this time, since an upper surface of the drip tray 72 of the idler gear shaft 37 is open, oil falling from an upper side in the cylinder bore 61 is received by the drip tray 72. The drip tray 72 has a semicircular cross section perpendicular to the axial direction of the idler gear shaft 37, and the oil received by the drip tray 72 is less likely to flow down from the drip tray 72. Further, only the drip tray 72 of the idler gear shaft 37 protrudes into the cylinder bore 61. Therefore, oil flowing along a wall surface of the cylinder bore 61 smoothly flows into the drip tray 72, and the oil flowing along the wall surface of the cylinder bore 61 is efficiently collected by the drip tray 72.

The drip tray 72 protrudes from a wall surface of a lower portion of the cylinder bore 61, and extends to an inner side of the cylinder bore 61 with respect to an outer peripheral surface of the piston 62. In this case, a piston boss 65 is formed to have a smaller diameter than a piston head 64, and the drip tray 72 enters a lower side of the piston head 64 and is brought close to the piston boss 65. In this case, the drip tray 72 is brought close to the piston boss 65 at a position avoiding a piston skirt 66. At every time when the piston 62 descends in the cylinder bore 61, the oil on the wall surface of the cylinder bore 61 is drawn downward and is collected toward the drip tray 72.

At least a portion of the drip tray 72 is located on a lower side of the piston head 64, which is located at the bottom dead center, and on an upper side of a lower end of the piston boss 65. Even when the piston 62 moves up and down between a top dead center and the bottom dead center, the piston 62 and the drip tray 72 do not interfere with each other. In a state where interference between the piston 62 and the drip tray 72 is suppressed, the idler gear shaft 37 is brought close to the piston 62, and thus the engine 10 is formed in a compact manner. Further, the oil is supplied from the cylinder bore 61 to the bearing 38 at a shortest distance through the oil passage 71 in the idler gear shaft 37. With an increase in the amount of oil supplied to the bearing 38, the durability of the bearing 38 is improved.

Figure 7:
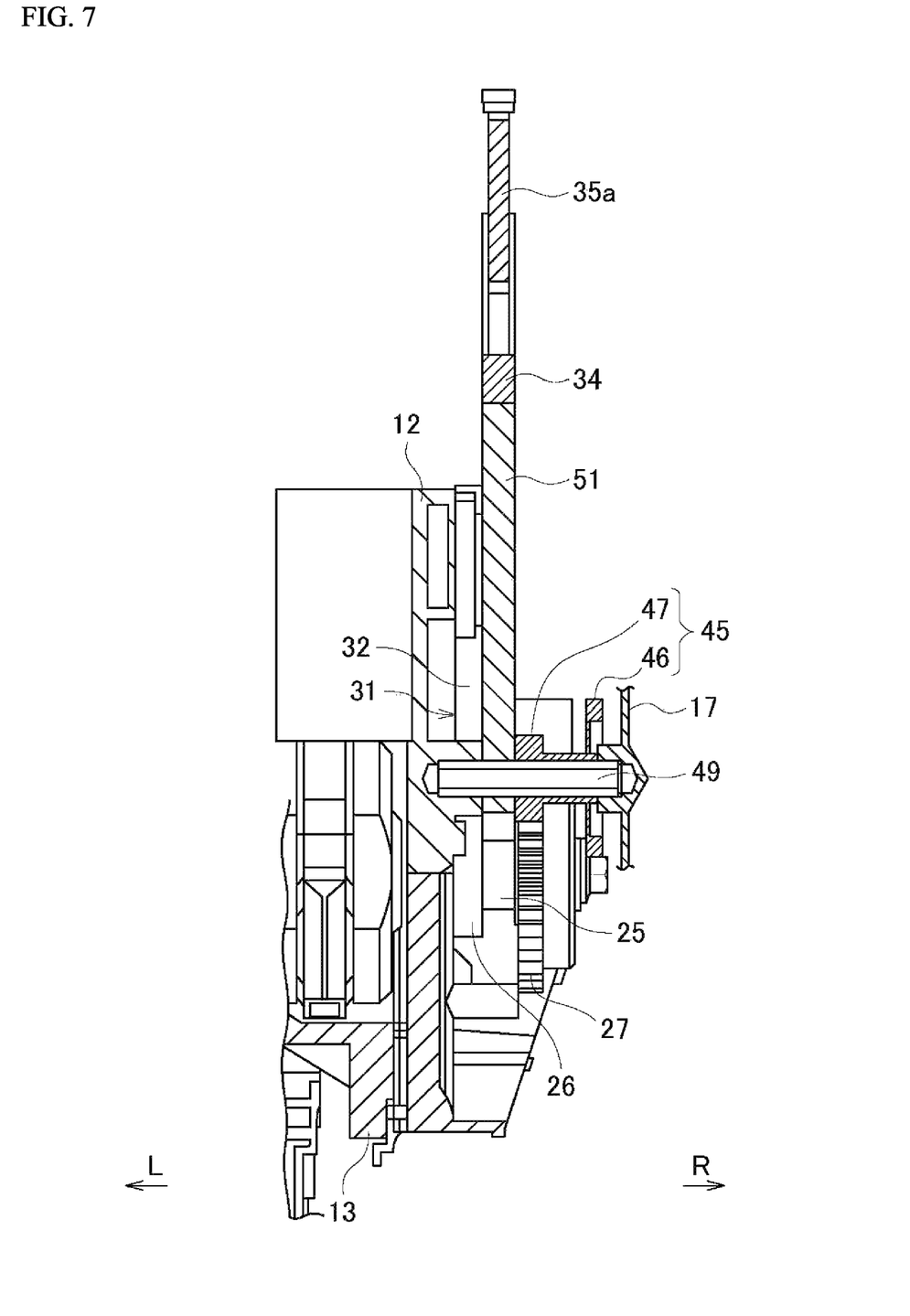
FIG. 7 is a cross-sectional view taken along a line B-B of FIG. 4.

A support structure for a lever guide of a chain tensioner will be described with reference to FIG. 7. FIG. 7 is a cross-sectional view taken along a line B-B of FIG. 4.

As illustrated in FIG. 7, the idler gear shaft 49 parallel to the crankshaft 25 is attached on an upper side of the crankshaft 25. The second starter idler gear 45 is rotatably supported by the idler gear shaft 49, and the lever guide 51 of the chain tensioner 50 is swingably supported by the idler gear shaft 49. The idler gear shaft 49 is supported at both ends by the upper case 12 and the clutch cover 17, and the upper case 12, the lever guide 51, the second starter idler gear 45, and the clutch cover 17 are arranged side by side in this order from the inner side in the engine width direction toward the outer side in the engine width direction.

The idler gear shaft 49 is used to support the second starter idler gear 45 and the lever guide 51, thereby reducing the number of components of the engine 10. Further, since the idler gear shaft 49 is sandwiched between the upper case 12 and the clutch cover 17, a fastening member such as a bolt is not required for attaching the lever guide 51 and the second starter idler gear 45. Further, since protrusion of a head portion of a fastening member from an outer surface of the clutch cover 17 as a case where the fastening member is used instead of the idler gear shaft 49 is avoided, a width of the engine is narrowed, and the engine 10 is made compact.

The lever guide 51 and the timing chain 34 are sandwiched between the large-diameter gear 32 of the chain idler gear 31 and the small-diameter gear 47 of the second starter idler gear 45. That is, in the vicinity of the crankshaft 25, a gear train for chain drive such as the chain drive gear 26 and the large-diameter gear 32 of the chain idler gear 31 is disposed on the inner side of the lever guide 51 and the timing chain 34 in the engine width direction. A gear train for a starter, such as the small-diameter gear 47 of the second starter idler gear 45 and the starter clutch gear 27, is disposed on the outer side of the lever guide 51 and the timing chain 34 in the engine width direction.

The gear train for chain drive and the gear train for a starter are separately disposed on the inner side in the engine width direction and the outer side in the engine width direction with the timing chain 34 serving as a reference. Accordingly, an arrangement space in the vicinity of the crankshaft 25 is effectively utilized as an arrangement space of the gear train for chain drive and the gear train for a starter. The base end portion of the lever guide 51 is sandwiched between the large-diameter gear 32 of the chain idler gear 31 and the second starter idler gear 45, and thus the large-diameter gear 32, the base end portion of the lever guide 51, and the second starter idler gear 45 are arranged in a packed manner. Therefore, the width of the engine is narrowed, and the engine 10 is made compact.

Further, the chain idler gear 31, the starter clutch gear 27, and the second starter idler gear 45 are arranged side by side in this order from the inner side in the engine width direction toward the outer side in the engine width direction. The chain idler gear 31, the starter clutch gear 27, and the second starter idler gear 45 partially overlap with one another in a side view (see FIG. 4), and these gears are aggregated in the vicinity of the crankshaft 25. Since the idler gear shaft 37 of the chain idler gear 31, the idler gear shaft 49 of the second starter idler gear 45, and the crankshaft 25 are brought close to one another, a length of the engine 10 in the front-rear direction is narrowed, and the engine 10 is made compact.

As described above, according to the present embodiment, the splashes of the oil in the cylinder bore 61 are taken in from the one end portion of the idler gear shaft 37 that protrudes into the cylinder bore 61, and are supplied to the bearing 38 through the oil passage 71 of the idler gear shaft 37. With an increase in the amount of oil supplied to the bearing 38, the durability of the bearing 38 is improved. In addition, with a decrease in a discharge amount of an oil pump, mechanical loss is reduced and an engine output is improved, as compared with a method of forcibly supplying oil to the bearing 38.

Although a semi-cam gear train in which gear transmission and chain transmission are combined is described as an example of the power transmission mechanism in the present embodiment, the power transmission mechanism may be a cam gear train configured only with gear transmission.

Although power is transmitted from the crankshaft to the timing chain via one idler gear in the present embodiment, power may be transmitted from the crankshaft to the timing chain via a plurality of idler gears.

Although the drip tray is formed at one end portion of the idler gear shaft in the present embodiment, the inlet of the oil passage may be formed at the one end portion of the idler gear shaft. For example, a through hole may be formed at the one end portion of the idler gear shaft as the inlet of the oil passage.

Although only the drip tray protrudes from the wall surface of the cylinder bore in the present embodiment, a portion other than the drip tray of the idler gear shaft may also protrude from the wall surface of the cylinder bore.

Further, in the present embodiment, the layout of the gears of the engine starting device and the power transmission mechanism is merely an example, and at least one end portion of the idler gear shaft may protrude from the wall surface of the cylinder bore.

In addition, the lubricating structure for the power transmission mechanism is not limited to be applied to an engine of a straddle-type vehicle, and may be applied to an engine of specialized equipment, such as a personal watercraft, a lawn mower, and an outboard motor, in addition to other vehicles such as a four-wheeled vehicle and a buggy type motor tricycle. The straddle-type vehicle is not limited to a general vehicle in which a rider rides in a posture of straddling a seat, and further includes a small-sized scooter-type vehicle in which a rider rides without straddling a seat.

As described above, the lubricating structure for the power transmission mechanism (30) of the present embodiment is a lubricating structure of a power transmission mechanism in which a crankshaft (25) is coupled to a piston (62) disposed in a cylinder bore (61) and in which power is transmitted from the crankshaft to a camshaft (36a, 36b). The lubricating structure includes an idler gear (chain idler gear 31) that is configured to transmit power from the crankshaft to the camshaft, and an idler gear shaft (37) that supports the idler gear via a bearing (38). One end portion of the idler gear shaft protrudes into the cylinder bore, and an oil passage (71) configured to guide oil from the cylinder bore to the bearing is formed in the idler gear shaft.

According to this configuration, splashes of the oil in the cylinder bore are taken in from the one end portion of the idler gear shaft that protrudes into the cylinder bore, and are supplied to the bearing through the oil passage of the idler gear shaft. With an increase in the amount of oil supplied to the bearing, durability of the bearing is improved. In addition, with a decrease in a discharge amount of an oil pump, mechanical loss is reduced and an engine output is improved, as compared with a method of forcibly supplying oil to the bearing.

In the lubricating structure for the power transmission mechanism of the present embodiment, an upper portion of the one end portion of the idler gear shaft is cut out to form an oil drip tray (72) serving as an inlet of the oil passage. According to this configuration, the oil in the cylinder bore can be efficiently collected by the oil drip tray, and performance of lubricating the bearing can be improved.

In the lubricating structure for the power transmission mechanism of the present embodiment, only the oil drip tray protrudes into the cylinder bore. According to this configuration, the amount of protrusion of the idler gear shaft can be minimized, the oil flowing along the wall surface of the cylinder bore can be efficiently collected, and the performance of lubricating the bearing can be improved.

In the lubricating structure for the power transmission mechanism of the present embodiment, the oil drip tray extends to an inner side of the cylinder bore with respect to an outer peripheral surface of the piston. According to this configuration, at every time when the piston descends in the cylinder bore, the oil on the wall surface of the cylinder bore is drawn downward and is collected toward the drip tray.

In the lubricating structure for the power transmission mechanism of the present embodiment, at least a part of the oil drip tray is located on a lower side of a piston head (64) of the piston located at a bottom dead center, and on an upper side of a lower end of a piston boss (65) of the piston. According to this configuration, the piston and the idler gear shaft are brought close to each other, and thus the engine can be formed in a compact manner.

Although the present embodiment has been described, the above-described embodiment and the modification may be combined in whole or in part as other embodiment.

The technique of the present invention is not limited to the above-described embodiment, and various changes, substitutions, and modifications may be made without departing from the spirit of the technical idea of the present invention. Further, the present invention may be implemented using other methods as long as the technical idea can be implemented by the methods through advance of the technology or other derivative technology. Accordingly, the claims cover all embodiments that may be included within the scope of the technical idea.

What is claimed is:

1. A lubricating structure for a power transmission mechanism in which a crankshaft is coupled to a piston disposed in a cylinder bore and in which power is transmitted from the crankshaft to a camshaft, the lubricating structure comprising:
- an idler gear that is configured to transmit power from the crankshaft to the camshaft; and
- an idler gear shaft that supports the idler gear via a bearing,
- wherein one end portion of the idler gear shaft protrudes into the cylinder bore, and an oil passage configured to guide oil from the cylinder bore to the bearing is formed in the idler gear shaft,
- wherein an upper portion of the one end portion of the idler gear shaft is cut out to form an oil drip tray serving as an inlet of the oil passage, and
- wherein only the oil drip tray protrudes into the cylinder bore.

2. The lubricating structure according to claim 1,
wherein the oil drip tray extends to an inner side of the cylinder bore with respect to an outer peripheral surface of the piston.

3. The lubricating structure according to of claim 1,
wherein at least a part of the oil drip tray is located on a lower side of a piston head of the piston located at a bottom dead center, and on an upper side of a lower end of a piston boss of the piston.

\* \* \* \* \*